United States Patent [19]

Leroux et al.

[11] Patent Number: 4,846,557

[45] Date of Patent: Jul. 11, 1989

[54] MATRIX DISPLAY DEVICE AND PROCESS FOR CONTROLLING SAID DEVICE

[75] Inventors: Thierry Leroux, Fontaine; Robert Truche, Gieres, both of France

[73] Assignee: Commissariat A L'Energie Atomique, Paris, France

[21] Appl. No.: 116,216

[22] Filed: Nov. 3, 1987

[30] Foreign Application Priority Data

Nov. 5, 1986 [FR] France ............................ 86 15411

[51] Int. Cl.⁴ ............................................. G02F 1/13
[52] U.S. Cl. .................................... 350/333; 350/334; 350/332
[58] Field of Search ........................ 350/332, 333, 334

[56] References Cited

U.S. PATENT DOCUMENTS

| 4,158,786 | 6/1979 | Hiresawa | 350/332 |
| 4,227,201 | 10/1980 | Orinberg et al. | 350/342 |
| 4,432,610 | 2/1984 | Kobayashi et al. | 350/333 |
| 4,470,060 | 9/1984 | Yamazaki | 357/41 |

FOREIGN PATENT DOCUMENTS 0075651 4/1983 European Pat. Off. .
0145520 6/1985 European Pat. Off. .
0176763 4/1986 European Pat. Off. ............ 350/334

OTHER PUBLICATIONS

Patent Abstracts of Japan, vol., 9, No. 129, (p. 361) (1852) Jun. 5, 1985.

Primary Examiner—Stanley D. Miller
Assistant Examiner—Huy Kim Mai
Attorney, Agent, or Firm—Nutter, McClennen & Fish

[57] ABSTRACT

A matrix display device applicable to liquid crystal displays comprises a display material having an optical property inserted between two insulating walls. On the inner face of one of the walls (1) are arranged n row conductors, m column conductors, p resistive conductors and p.k electrodes grouped into $p=m.(n-1)$ packets of k electrodes each, the electrodes $E_1 \ldots E_k$ of one packet $P_{ii'j}$ being connected by switches $I_1 \ldots I_k$ to a column conductor $C_j$ and to a resistive conductor $R_{ii'j}$, itself connected between two row conductors $L_i$ and $L_{i'}$, with i, i' and j being integers such that $i \neq i'$, $1 \leq i < n$, $1 < i \leq n$ and $1 \leq i \leq m$. On the inner face of the other wall is placed a counterelectrode. A process for controlling the display device is also disclosed. The invention more particularly applies to liquid crystal display devices.

11 Claims, 6 Drawing Sheets

MATRIX DISPLAY DEVICE AND PROCESS FOR CONTROLLING SAID DEVICE

The present invention relates to a matrix display device and to a process for controlling said device.

BACKGROUND OF THE INVENTION

The invention is used in optoelectronics and mainly in liquid crystal display devices, particularly used as converters of electrical information into optical information, in the real time processing of optical images and in analog displays.

More specifically, the invention relates to an active matrix display device incorporating a display material having an optical property. The optical property of the display material is e.g. opacity, a refractive index, transparency, absorption, diffusion, diffraction, convergence, etc. Moreover, said material can be an amorphous or crystalline, liquid or solid body.

FIGS. 1a and 1b respectively diagrammatically show a perspective of an embodiment of a known active matrix display device and the inner face of one of the walls of said device.

FIG. 1a shows a first and a second insulating walls 1,3 facing one another and which are kept spaced and sealed by a joint 5. Between said walls is placed a display material layer 7 having an optical property, said material e.g. being a liquid crystal film.

Over the inner face of one of the walls 1 (FIGS. 1a and 1b) are distributed n parallel row conductors, designated $L_i$ and m parallel column conductors designated $C_j$, which intersect the row conductors, i and j being integers such that $1 \leq i \leq n$ and $1 \leq j \leq m$, said row and column conductors carrying electric signals appropriate for exciting the display material 7 and generated by not shown addressing means.

At the intersection of each row conductor $L_i$ and each column conductor $C_j$ is provided a switch $I_{ij}$, such as a field effect transistor connected by its gate to the row conductor $L_i$ and arbitrarily by its source and drain to the column conductor $C_j$ and to an electrode $E_{ij}$.

Moreover, the inner face of the other wall 3 is covered by a conductive material serving as a counterelectrode 13, which is raised to a reference potential.

An image point $A_{ij}$ is defined by a capacitor formed by electrode $E_{ij}$ and counterelectrode 13, the material 7 inserted between these two electrodes forming the dielectric of the capacitor.

In order to select an image point $A_{ij}$, onto the row conductor $L_i$ is passed an electric signal, which selects the on state of the group of transistors connected to said row conductor and in particular the on state of transistor $I_{ij}$ associated with said image point. This transistor then transmits to the electrode $E_{ij}$ to which it is connected, the electric signal coming from the column conductor $C_j$. Between electrode $E_{ij}$ and counterelectrode 13 appears an electric field, which will bring about the excitation and collective orientation of the molecules of the display material placed between electrode $E_{ij}$ and counterelectrode 13, when the signal from column $C_j$ is equal to or greater than a threshold potential $V_S$ corresponding to the minimum value necessary for exciting material 7. This collective orientation will modify the optical property of the material at image point $A_{ij}$.

By using the punctiform excitation of the liquid crystal, an image appears on the complete display device whilst defining it point by point.

Other types of active matrix display devices are known. Thus, e.g. FR-A-No. 2 553 218 describes an active matrix display device having on the inner face of one of its walls, a matrix of electrodes connected by switches to row conductors and on the inner face of the other wall, column electrodes facing the matrix of electrodes and connected to column conductors, the switches also being connected to a reference potential.

The number of image points of the known display devices is equal to the number of row conductors multiplied by the number of column conductors, or in other words n.m. Moreover, any increase in the number of image points in a known display device leads to an increase in the number of row and/or column conductors and therefore to an increase in the constructional complexity of the display device and to an increase in its inactive surface. The inactive surface corresponds to a surface not occupied by the matrix of electrodes of the device, each electrode of said matrix corresponding to an image point.

SUMMARY OF THE INVENTION

The invention therefore aims at obviating these disadvantages and in particular at providing an active matrix display device with a number of image points exceeding the product of the number of row conductors and the number of column conductors. The invention particularly applies to all active matrix display devices and especially to those described hereinbefore.

More specifically, the present invention relates to a matrix display device having a display material with an optical property inserted between a first and a second insulating wall, characterized in that it comprises a matrix of p.k elements, each constituted by a switch and an image point defined by a capacitor formed from two electrodes arranged on two walls, n row conductors, m column conductors and p resistive conductors, each resistive conductor $R_{ii'j}$ being connected between two row conductors $L_i$, $L_{i'}$ with p, k, n, m, i, i', and j integers such that $i \neq i'$, $1 \leq i < n$, $1 < i \leq n$, $1 \leq j \leq m$ and $p = m.(n-1)$, the p.k elements being grouped into p packets of k elements each, the elements of each packet being connected to a column conductor and to a resistive conductor, signals appropriate for the excitation of the display material being applied to the row conductors and to the column conductors.

The display device according to the invention makes it possible to have $k.p = k.m.(n-1)$ image points with n row conductors and m column conductors instead of m.n image points with the known display device.

According to an embodiment of the display device according to the invention, on the inner face of the first wall are arranged n row conductors, m column conductors, p resistive conductors and p.k electrodes grouped into p packets of k electrodes each, with p, k, m and n being integers and $p = m(n-1)$, the electrodes $E_1 \ldots E_k$ of a packet $P_{ii'j}$ being respectively connected by switches $I_1 \ldots I_k$ to a column conductor $C_j$ and to a resistive conductor $R_{ii'j}$, itself connected between two row conductors $L_i$ and $L_{i'}$, with i, i' and j such that $i \neq i'$, $1 \leq i < n$, $1 \leq i \leq n$ and $1 \leq j \leq m$ and on the inner face of the second wall is disposed a counterelectrode formed from a continuous layer of a conductive material raised to a reference potential.

In this device, an image point is defined by a capacitor formed by an electrode and the facing part of the counterelectrode.

Moreover, the row conductors and column conductors e.g. intersect on the inner face of one of the walls of the device and the resistive conductors connected to the row conductors are parallel to the column conductors. However, it is obvious that any other arrangement of the row conductors, column conductors and resistive conductors on one of the walls of the device can be envisaged.

Each packet $P_{ii'j}$ of electrodes relative to a packet of elements is e.g. inserted between the row conductor $L_i$ and the row conductor $L_{i'}$, to the left or right of the column conductor $C_j$ and the resistive conductor $R_{ii'j}$, i' is advantageously equal to $i+1++1 \leq i < n$, $1 < i' \leq n+$.

According to a preferred embodiment of the display device, the display material is a liquid crystal film, the exciting signals being voltages.

Advantageously, the switches are field effect transistors, each transistor $I_l$ associated with an electrode $E_l$ of a packet $P_{ii'j}$ being connected by its gate to the corresponding resistive conductor $R_{ii'j}$, by a second terminal to the corresponding column conductor $C_j$ and by a third terminal to said electrode $E_l$ with L being an integer such that $1 \leq l \leq k$. The second and third terminals of a transistor are arbitrarily the source and drain of the transistor.

According to another preferred embodiment of the invention, the resistive conductors comprise resistors in series. The resistive value of each resistive conductor $R_{ii'j}$ is preferably identical.

Moreover, the resistive value of a resistive conductor $R_{ii'j}$ connected by k switches $I_1 \ldots I_k$ to the image points $A_{ii'j1} \ldots A_{ii'jk}$ of a packet of elements, between the row conductor $L_i$ and switch $I_1$, between the row conductor $L_{i'}$ and switch $I_k$ and between the different switches $I_1$ and $I_2$, $I_2$ and $I_3 \ldots I_{k-1}$ and $I_k$ to which it is connected is identical.

The invention also relates to a process for controlling a display device, which is characterized in that for controlling the optical property of the display material at image points $A_{ii'j1} \ldots A_{ii'jk}$, corresponding to a packet of elements, with i, i', j and k being integers such that $i \neq i'$, $1 \leq i < n$, $1 < i' \leq n$ and $1 \leq j \leq m$, during a time $T_s = T/(n-1)$ divided into k time fractions $t_l$ are applied to the row conductors $L_i$ and $L_{i'}$, respectively exciting signals $V_i$ and $V_{i'}$, so that for each time fraction $t_l$ at least one of the switches $I_1 \ldots I_k$ associated with said points is closed, so that each of said switches is closed over at least one time fraction $t_l$, with L being an integer such that $1 < l < k$, said switches being connected to the resistive conductors $R_{ii'j}$ and to the other row conductors, exciting signals bringing about the opening of the switches associated with said other row conductors, T being the addressing period of an image point.

The exciting signals supplied on the column conductors are dependent on the desired display.

In order to obtain an excited state, or in other words a displayed state at image point $A_{ii'jl}$, to the corresponding column conductor $C_j$ is supplied an exciting signal of value equal to or greater than the threshold potential $V_S$, at least during the final time fraction $t_l$ during which the corresponding switch $I_l$ is closed, said time $t_l$ corresponding to a fraction of the addressing time $T_s$ of the packet of image points $A_{ii'j1} \ldots A_{ii'jk}$.

As a function of the value of said exciting signal during said time fraction $t_l$, different grey levels can be displayed at image point $A_{ii'jl}$, obviously provided that said value is equal to or exceeds the threshold potential $V_S$.

Conversely, to obtain a non-excited state, or in other words a non-displayed state at image point $A_{ii'jl}$, to the column conductor $C_j$ is supplied an exciting signal having a value below the threshold potential $V_S$ at least during said final time fraction $t_l$ during which the corresponding switch $I_l$ is closed.

The different states assumed by the image point $A_{ii'jl}$ during the different time fractions of the corresponding time $T_s$ prior to the final time fraction $t_l$ and during which the switch $I_l$ of said image point is closed, cannot be seen by an observer as a result of their short duration. Only the state assumed by the image point during said time $t_l$ and retained for the remainder of time T can be seen by an observer.

According to an embodiment of the control process, to the row conductors $L_i$ and $L_{i'}$ are respectively applied exciting signals $V_i$ and $V_{i'}$, so that at each time fraction $t_l$ of the addressing time $T_s$ of image points $A_{ii'j1} \ldots A_{ii'jk}$, with l being an integer such that $1 \leq l \leq k$, one of the switches associated with said image points and closed during time $t_{l-1}$ is opened, the other switches retaining their state, all the switches associated with said image points being closed at time $t_1$.

Numerous exciting signals of this type can be applied to the row conductors.

Thus, advantageously, to the row conductors $L_i$ and $L_{i'}$ are respectively applied exciting signals $V_i$ and $V_{i'}$, so that at each time fraction $t_l$ of the addressing time $T_s$ of the image points $A_{ii'j1} \ldots A_{ii'jk}$, the switches $I_1 \ldots I_u$ associated with said image points are closed, with u being an integer such that $u = k - (l-1)$ and the other switches associated with said image points are opened.

According to a variant, to the row conductors $L_i$ and $L_{i'}$ are respectively applied exciting signals $V_i$ and $V_{i'}$, so that at each time fraction $t_l$ of the addressing time $T_s$ of the image points $A_{ii'j1} \ldots A_{ii'jk}$, the switches $I_l \ldots I_k$ associated with said image points are closed and the other switches associated with said image points are opened.

In the particular case where $k=3$, as in the case of the three-colour method, another embodiment of this process can be used. This consists of applying to the row conductor $L_i$ and $L_{i'}$, respectively exciting signals $V_i$ and $V_{i'}$, so that at time $t_1$, switches $I_1$, $I_2$ and $I_3$ are closed, at time $t_2$ switch $I_1$ is closed and switches $I_2$ and $I_3$ are opened and at time $t_3$ switch $I_3$ is closed and switches $I_1$, $I_2$ are opened, times $t_1$, $t_2$ and $t_3$ being three time fractions of the addressing time $T_s$ of the image points $A_{ii'j1}$, $A_{ii'j2}$, $A_{ii'j3}$.

BRIEF DESCRIPTION OF THE DRAWINGS

Other features and advantages of the invention can be gathered from the following non-limitative description with reference to the attached drawings, wherein show.

DESCRIPTION OF THE PREFERRED EMBODIMENTS

The display device according to the invention comprises two facing insulating walls between which is placed a display material.

Figure 1A:
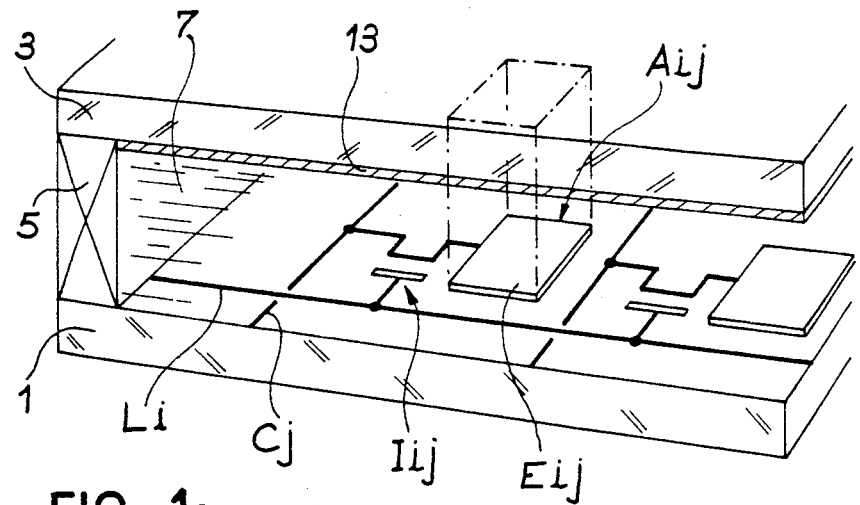
FIGS. 1a and 1b, already described, show diagrammatically and respectively a known display device in perspective and the inner face of the wall of said device on which is arranged a matrix of electrodes.
Figure 1B:
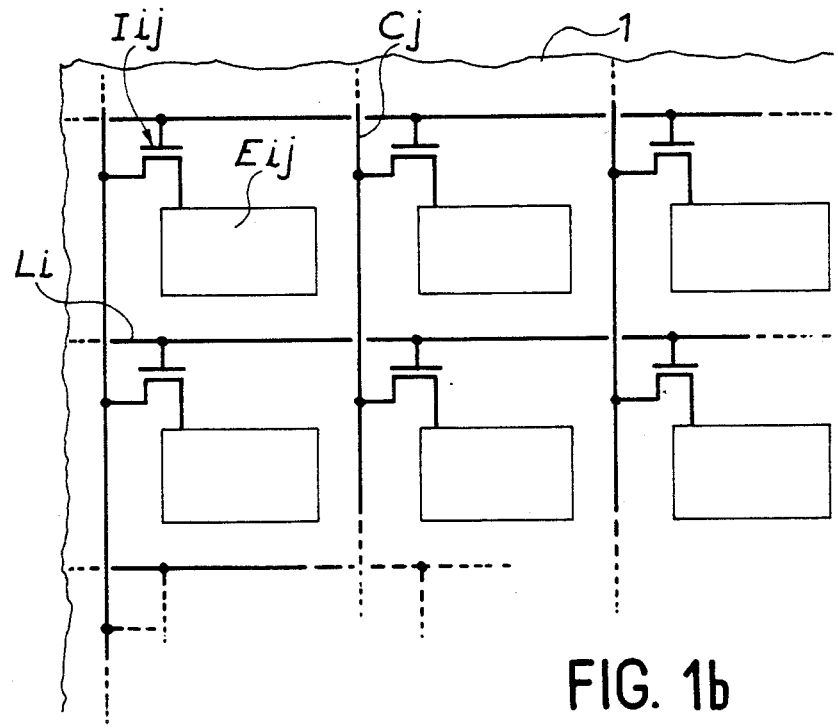

According to an embodiment, on the inner face of one of the walls 3 is disposed, as in the display device described relative to FIG. 1a, a counterelectrode formed by a continuous layer of a conductive material raised to a reference potential.

On the inner face of the other wall 1 (FIG. 2) are arranged n parallel row conductors, designated $L_i$, m parallel column conductors, designated $C_j$ intersecting with the row conductors and p=(n−1).m resistive conductors, designated $R_{ii'j}$, which are parallel to the column conductors and respectively connected between two row conductors $L_i$ and $L_{i'}$, with i, i' and j being integers such that i≠i', ++1≦i<n, 1<i'≦n and 1≦j≦m; whereby i' is here equal to i+1.

Moreover, on the inner face of the wall are arranged p.k electrodes grouped into p packets, designated $P_{ii'j}$ of k electrodes each, designated $E_l$, with l being an integer such that 1≦l≦k. Each packet $P_{ii'j}$ of electrodes is inserted between two row conductors $L_i$, $L_{i'}$, e.g. to the left of the column conductor $C_j$ and the resistive conductor $R_{ii'j}$.

Figure 2:
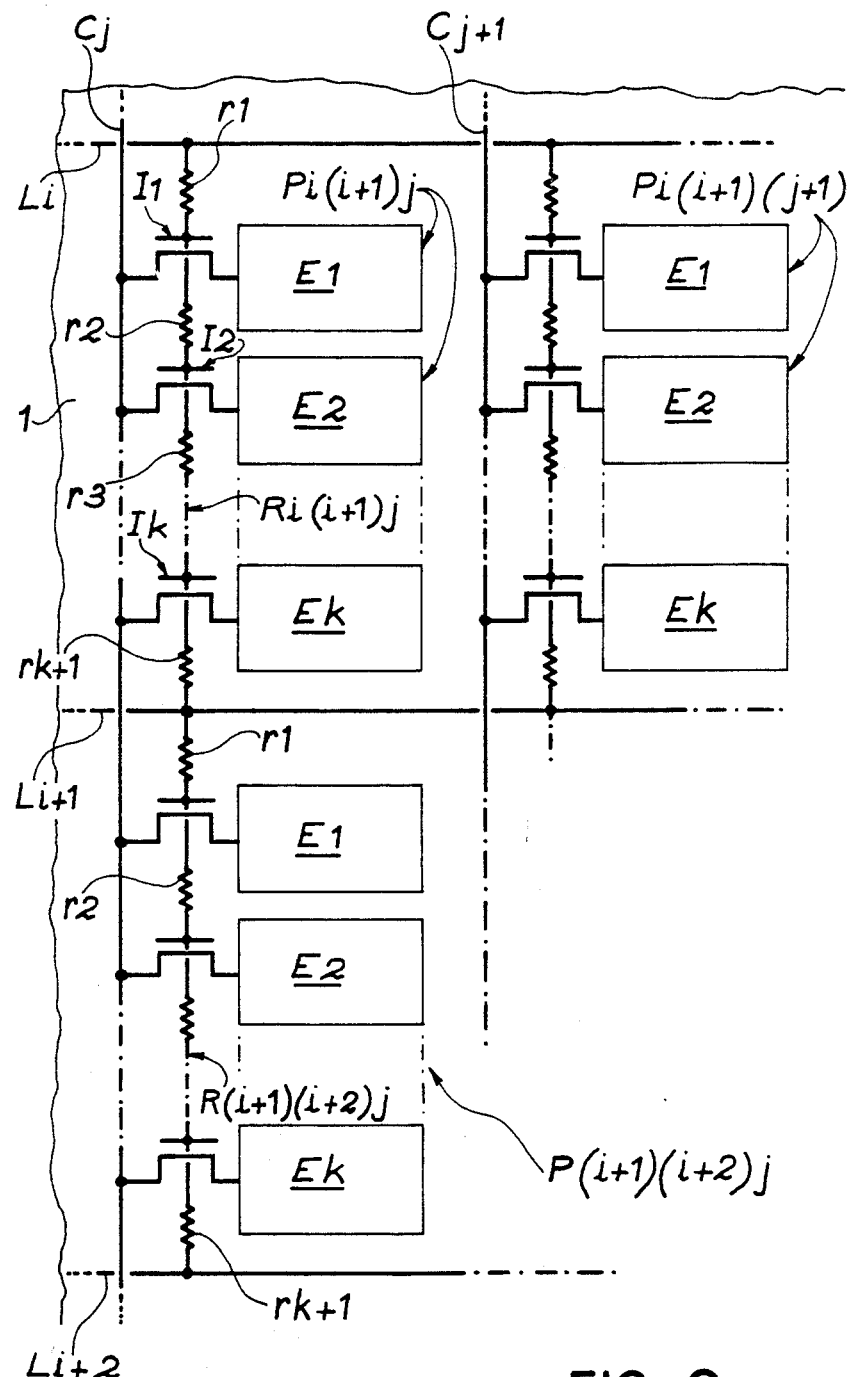
FIG. 2 show diagrammatically the inner face of the wall of an embodiment of the display device according to the invention on which is arranged a matrix of electrodes.

The electrodes of a packet of electrodes can be parallel to one another, as shown in FIG. 2, or can be differently arranged, e.g. in staggered manner.

Each electrode $E_l$ of a packet $P_{ii'j}$ is connected to the resistive conductor $R_{ii'j}$ and to the column conductor $C_j$ by means of a switch $I_l$, said resistive conductor also being connected between two row conductors $L_i$ and $L_{i'}$.

In this device, an image point $A_{ii'jl}$ is defined by the capacitor formed by the electrode $E_l$ of packet $P_{ii'j}$ and the counterelectrode. Thus, this device has p packets of k image points each, each image point and the switch associated therewith constituting one of the elements of the matrix of elements of the display device. The switches of the display device according to the invention are advantageously field effect transistors.

Thus, each electrode $E_l$ of a packet $P_{ii'j}$ is connected to the source or drain of a transistor $I_l$, the gate of said transistor is connected to the resistive conductor $R_{ii'j}$ and its drain or source to the column conductor $C_j$. It is possible to connect either the source or the drain of transistor $I_l$ to the corresponding column conductor and to the electrode $E_l$.

Each resistive conductor $R_{ii'j}$ associated with a packet $P_{ii'j}$ of electrodes $E_1 \ldots E_k$ and connected between row conductors $L_i$ and $L_{i'}$, e.g., comprises in the manner shown in FIG. 2 resistors in series. Thus, a resistor $r_1$ is inserted between row conductor $L_i$ and switch $I_1$, a resistor $r_2$ is inserted between switches $I_1$ and $I_2$ and so on up to resistor $r_{k+1}$ inserted between switch $I_k$ and row conductor $L_{i'}$. When k is equal to 4, the resistive conductor $R_{ii'j}$ comprises five resistors in series $r_1$, $r_2$, $r_3$, $r_4$ and $r_5$.

Advantageously, each resistive conductor $R_{ii'j}$ of the display device has the same resistors in series $r_1, r_2 \ldots r_l \ldots r_{k+1}$, said resistors can have the same resistive values.

The gate of a transistor $I_l$ connected to a resistive conductor $R_{ii'j}$ is at a potential which is in the widest sense between the potential of the row conductor $L_i$ and the potential of the row conductor $L_{i'}$. For transistor $I_l$ to be conductive or on, the potential applied to its gate must be equal to or greater than the threshold potential $V_t$. In the opposite case the transistor is non-conductive or off.

By appropriately choosing the exciting signals applied to the row conductors, it is possible to selectively make conductive the transistors associated with these row conductors via resistive conductors. When a transistor $I_l$ connected to an electrode $E_l$ of a packet $P_{ii'j}$ is conductive, it transmits to electrode $E_l$ the exciting signal carried by the corresponding column conductor $C_j$.

The display device according to the invention is compatible with all field effect transistor construction technologies, such as that which consists of producing the transistor source and drain and then its gate and that consisting of firstly producing the transistor gate and using the latter as a mask for defining the transistor drain and source, so that the latter are auto-positioned with respect to the gate.

Moreover, each resistive conductor is constituted by a resistive material deposit, whose dimensions are a function of the values of resistors $r_1 \ldots r_{k+1}$. Moreover, the gates of the transistor are not traversed by currents, so that the latter can be defined in the resistive material deposit constituting resistive conductors. Thus, for example, a resistive conductor, whose resistors $r_1 \ldots r_{k+1}$ are of the same value, is constituted by a resistive material deposit having k+1 parts of the same length, the same width and the same thickness, each part corresponding to a resistor and k fractions inserted between these k+1 parts constituting the gates of the transistors connected to said resistive conductor. The width of said fractions is generally less than the width of said parts.

Advantageously, the row conductors and optionally part of the column conductors are produced at the same time as the resistive conductors and the gates of the transistors, by the deposition of a resistive material, such as type n+ hydrogenated amorphous silicon, silicide or indium and tin oxide through an appropriately patterned mask. Advantageously, this is followed in known manner by a doubling of the row and column conductors, which makes it possible to reduce the resistivity thereof.

When the display device according to the invention is considered by transmission, the two walls 1,3 of the device are transparent, as are the electrodes and counterelectrode. However, when the device is considered by reflection, it is sufficient for the wall nearest to the observer to be transparent, together with the electrodes or counterelectrode associated with said wall. Obviously the two walls, the electrodes and the counterelectrode of the display device can also be transparent.

FIGS. 3 to 6 give examples of signals applied to the row and column conductors for controlling the optical property of the display material at the image points associated with a packet of electrodes.

Figure 3:
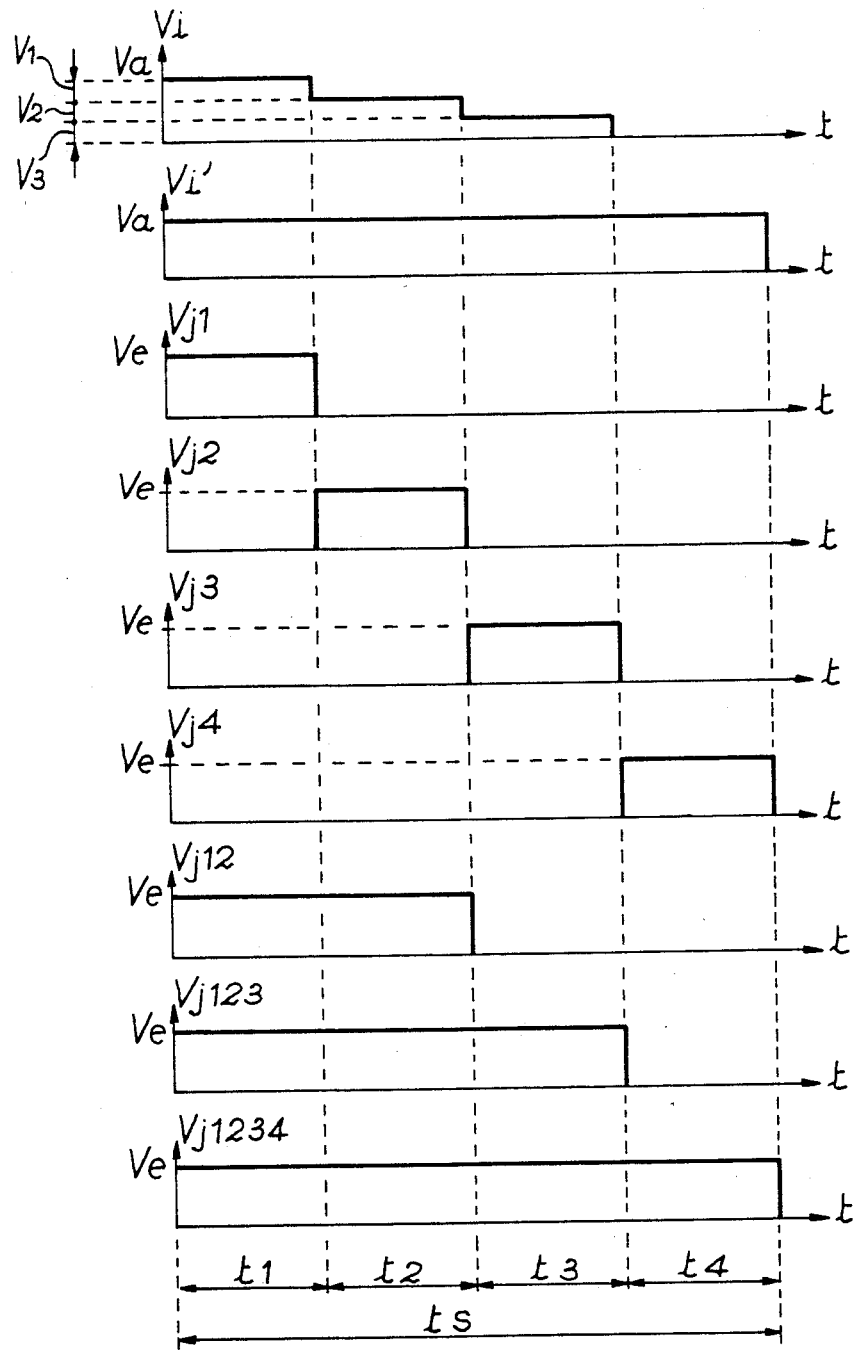
FIG. 3 is timing diagram of an example of signals applied to the row conductors $L_i$ and $L_{i'}$ and to the column conductor $C_j$ for exciting the display material placed between the counterelectrode and one or more electrodes of the corresponding packet or group $P_{ii'j}$.

FIG. 3 shows a first example of exciting signals making it possible to control the optical property of the display material at the image points associated with a packet $P_{ii'j}$ of electrodes. For reasons of clarity of the description, one has chosen packets respectively of 4 electrodes (k=4), it being understood that k can assume any random integral value starting from 1.

The exciting signals $V_i$ and $V_{i'}$ are respectively applied to the row conductors $L_i$ and $L_{i'}$. The exciting signals $V_{j1}$, $V_{j2}$, $V_{j3}$ and $V_{j4}$ are applied to the column conductor $C_j$ for controlling a displayed state respectively at the image points corresponding to electrodes $E_1$, $E_2$, $E_3$ and $E_4$ and the exciting signals $V_{j1,2,3}$ and $V_{j1, 2,3,4}$ are applied to the column conductor $C_j$ for controlling a displayed state at the image points corresponding respectively to electrodes $E_1$, $E_2$ and $E_3$ and to electrodes $E_1$, $E_2$, $E_3$ and $E_4$.

For addressing a packet $P_{ii'j}$ of electrodes, during a time $T_s=T/(n-1)$ exciting signals $V_i$ and $V_{i'}$ are supplied to the corresponding row conductors $L_i$ and $L_{i'}$, selecting either the conductive state or the non-conductive state of the transistors associated with these row conductors via resistive conductors and exciting signals are applied to the other row conductors differing from $L_i$ and $L_{i'}$, which block the transistors associated with said other row conductors, T being the addressing period of an image point. At the following time $T_s$, exciting signals are supplied to two other row conductors such as conductors $L_{i'}$ and $L_{i''}$ with e.g. i'=i+1 and i''=i+2, which select the on or off state of the transistors associated therewith, whilst two other row conductors are applied signals blocking the transistors associated with said other row conductors and so on until all the packets of electrodes have been addressed. Moreover, the exciting signals carried by the column conductors are trasmitted to the electrodes connected to closed switches.

Each time $T_s$ is divided into k time fractions $t_l$, each time fraction $t_l$, with l being an integer such that $1 \leq l \leq k$, makes it possible to select the conductive state of at least one of the transistors associated with a packet of electrodes.

The following description is given for the addressing of four electrodes $E_1, E_2, E_3, E_4$ of a packet $P_{ii'j}$ (k=4). Moreover, the resistors $r_1$, $r_2$, $r_3$, $r_4$, $r_5$ respectively inserted between conductor $L_i$ and transistor $I_1$, between transistors $I_1$ and $I_2$, between transistors $I_2$ and $I_3$, between transistors $I_3$ and $I_4$ and between transistors $I_4$ and row conductor $L_{i'}$ are given the same resistive value.

At time $t_1$, signals $V_i$ and $V_{i'}$ respectively applied to the row conductors $L_i$ and $L_{i'}$ have the same value equal to $V_a$, such that $V_a$ is equal to or greater than $V_t$. The gates of transistors $I_1$, $I_2$, $I_3$, $I_4$ associated with electrodes $E_1$, $E_2$, $E_3$, $E_4$ are consequently at potential $V_a$, transistors $I_1$, $I_2$, $I_3$, $I_4$ being conductive.

At time $t_2$, signal $V_i$ is equal to $V_a-V_1$ and signal $V_{i'}$ is equal to $V_a$. The gates of transistors $I_1$, $I_2$, $I_3$ and $I_4$ are respectively at potentials $V_a-4V_1/5$, $V_a-3V_1/5$, $V_a-2V_1/5$ and $V_a-V_1/5$. The value of $V_1$ is chosen so as to verify the following inequation:

$$V_a-kV_1/(k+1)<V_t \leq V_a-(k-1)V_1/(k+1),$$

in other words for k=4, $V_1$ is such that:

$$V_a-4V_1/5<V_t \leq V_a-3V_1/5$$

Thus, at time $t_2$, the transistor $I_1$ is blocked and transistors $I_2$, $I_3$ and $I_4$ are conductive.

At time $t_3$, signal $V_i$ is equal to $V_a-(V_1+V_2)$ and signal $V_{i'}$ is equal to $V_a$. The gates of transistors $I_1$, $I_2$, $I_3$ and $I_4$ are respectively at potentials $V_a-4(V_1+V_2)/5$, $V_a-3(V_1+V_2)/5$, $V_a-2(V_1+V_2)/5$ and $V_a-(V_1+V_2)/5$ with $V_2$ such that:

$$V_a-3(V_1+V_2)/5<V_t \leq V_a-2(V_1+V_2)/5$$

At time $t_3$, transistors $I_1$ and $I_2$ are blocked and transistors $I_3$ and $I_4$ are conductive.

At time $t_4$, signal $V_i$ is equal to $V_a-(V_1+V_2+V_3)$ and signal $V_{i'}$ is equal to $V_a$. The gates of transistors $I_1$, $I_2$, $I_3$ and $I_4$ are respectively at potentials $V_a-4(V_1+V_2+V_3)/5$, $V_a-3(V_1+V_2+V_3)/5$, $V_a-2(V_1+V_2+V_3)/5$ and $V_a-(V_1+V_2+V_3)/5$ with $V_3$ such that:

$$V_a-2(V_1+V_2+V_3)/5<V_t \\ \leq V_a-(V_1+V_2+V_3)/5$$

Thus, at time $t_4$, transistors $I_1$, $I_2$, $I_3$ are blocked and transistor $I_4$ is conductive.

Potentials $V_1$, $V_2$, $V_3$ can be chosen equal or different. Moreover, potential $V_a$ can be equal to the sum of potentials $V_1$, $V_2$ and $V_3$, as shown in FIG. 3, but it can obviously also exceed this sum.

For controlling a displayed state at image point $A_{ii'j1}$, or in other words for exciting the display material inserted between electrode $E_1$ of packet $P_{ii'j}$ and the counterelectrode, to column conductor $C_j$ is supplied a signal $V_{j1}$ of value $V_e$ during time $t_1$ when all the switches are conductive and of zero value at times $t_2$, $t_3$, $t_4$ during which transistor $I_1$ is non-conductive. The value of $V_e$ is such that $V_e \geq V_S$.

Thus, at time $t_1$, transistors $I_1$, $I_2$, $I_3$ and $I_4$ will transmit to the corresponding electrodes the potential $V_e$.

At time $t_2$, the transistor $I_1$ is blocked, electrode $E_1$ consequently retaining the potential $V_e$, except for the voltage drop. Conversely, transistors $I_2$, $I_3$ and $I_4$ are conductive and as signal $V_{j1}$ is zero, the potentials of electrodes $E_2$, $E_3$ and $E_4$ are also zero.

At times $t_3$ and $t_4$, during which respectively transistor $I_2$ and transistor $I_3$ are in turn blocked, signal $V_{j1}$ remaining zero, so that the potentials of electrodes $E_2$, $E_3$ and $E_4$ remain unchanged. Thus, signal $V_{j1}$ makes it possible to excite the display material solely between electrode $E_1$ and the counterelectrode.

For controlling a displayed state solely at image point $A_{ii'j2}$, in other words for exciting the display material inserted between the corresponding electrode $E_2$ and the counterelectrode, to column $C_j$ is supplied a zero signal $V_{j2}$ at time $t_1$, $t_3$, $t_4$ and equal to $V_e$ at time $t_2$.

Thus, at time $t_1$ transistors $I_1$, $I_2$, $I_3$ and $I_4$ are conductive and signal $V_{j2}$ is zero, so that no potential is applied to the corresponding electrodes. At time $t_2$, transistor $I_1$ is non-conductive, the non-zero signal $V_e$ applied to the column $C_j$ being transmitted solely by the conductive transistors $I_2$, $I_3$, $I_4$ to the corresponding electrodes $E_2$, $E_3$, $E_4$. At time $t_3$, switch $I_2$ is blocked, so that electrode $E_2$ retains the potential $V_e$ and conversely transistors $I_3$ and $I_4$ are conductive, a zero potential being applied to the corresponding electrodes. At time $t_4$, transistor $I_3$ is in turn blocked, the potential of electrode $E_3$ consequently remaining zero and the transistor $I_4$ is conductive, but as signal $V_{j2}$ is zero, the potential of electrode $E_4$ is also zero.

In the same way, for controlling a displayed state solely at image point $A_{ii'j3}$, to the corresponding column conductor is supplied a signal $V_{j3}$ equal to $V_e$ solely during time $t_3$ corresponding to the final time fraction of time $T_s$ during which transistor $I_3$ is conductive. For controlling a displayed state solely at image point $A_{ii'j4}$, to the corresponding column conductor is supplied a signal $V_{j4}$ equal to $V_e$ solely during the time $t_4$ corresponding to the final time fraction of the time $T_s$ during which the transistor $I_4$ is conductive.

When it is wished to control a displayed state at two image points corresponding to two electrodes of an electrode packet, to the corresponding column electrode $C_j$ is supplied an electric signal equal to the sum of the signals making it possible to control a displayed state at each of the image points alone. Thus, for controlling a displayed state at image points $A_{ii'j1}$ and $A_{ii'j2}$, to the corresponding column conductor $C_j$ is supplied a signal $V_{j1,2}$ equal to the sum of signals $V_{j1}$ and $V_{j2}$.

For controlling a displayed state at three image points corresponding to three electrodes of an electrode packet, in the same way combination takes place of the exciting signals making it possible to control a displayed state at each of the image points alone. Thus, when it is wished to control a displayed state at image points $A_{ii'j1}$, $A_{ii'j2}$ and $A_{ii'j3}$, to the column conductor $C_j$ is supplied a signal $V_{j1,2,3}$ corresponding to the sum of the signals $V_{j1}$, $V_{j2}$, $V_{j3}$.

In the same way, for controlling a displayed state for all the image points corresponding to an electrode packet, to the corresponding column conductor $C_j$ is supplied a signal equal to the sum of the signals making it possible to control a displayed state at each of the image points alone. Thus, for controlling a displayed state at image points $A_{ii'j1}$, $A_{ii'j2}$, $A_{ii'j3}$ and $A_{ii'j4}$, to the column conductor $C_j$ is supplied a signal $V_{j1,2,3,4}$ corresponding to the sum of the signals $V_{j1}$, $V_{j2}$, $V_{j3}$ and $V_{j4}$.

This example of the control of the display device according to the invention consequently comprises applying to the row conductors $L_i$ and $L_{i'}$, exciting signals $V_i$ and $V_{i'}$ bringing about for each time fraction $t_l$ of the addressing time $T_s$ of electrodes of a packet, the passing state of transistors $I_l \ldots I_k$ associated with said electrodes and the block state of the other transistors associated with said electrodes. The signals supplied to the column conductors are dependent on the desired display.

Figure 4:
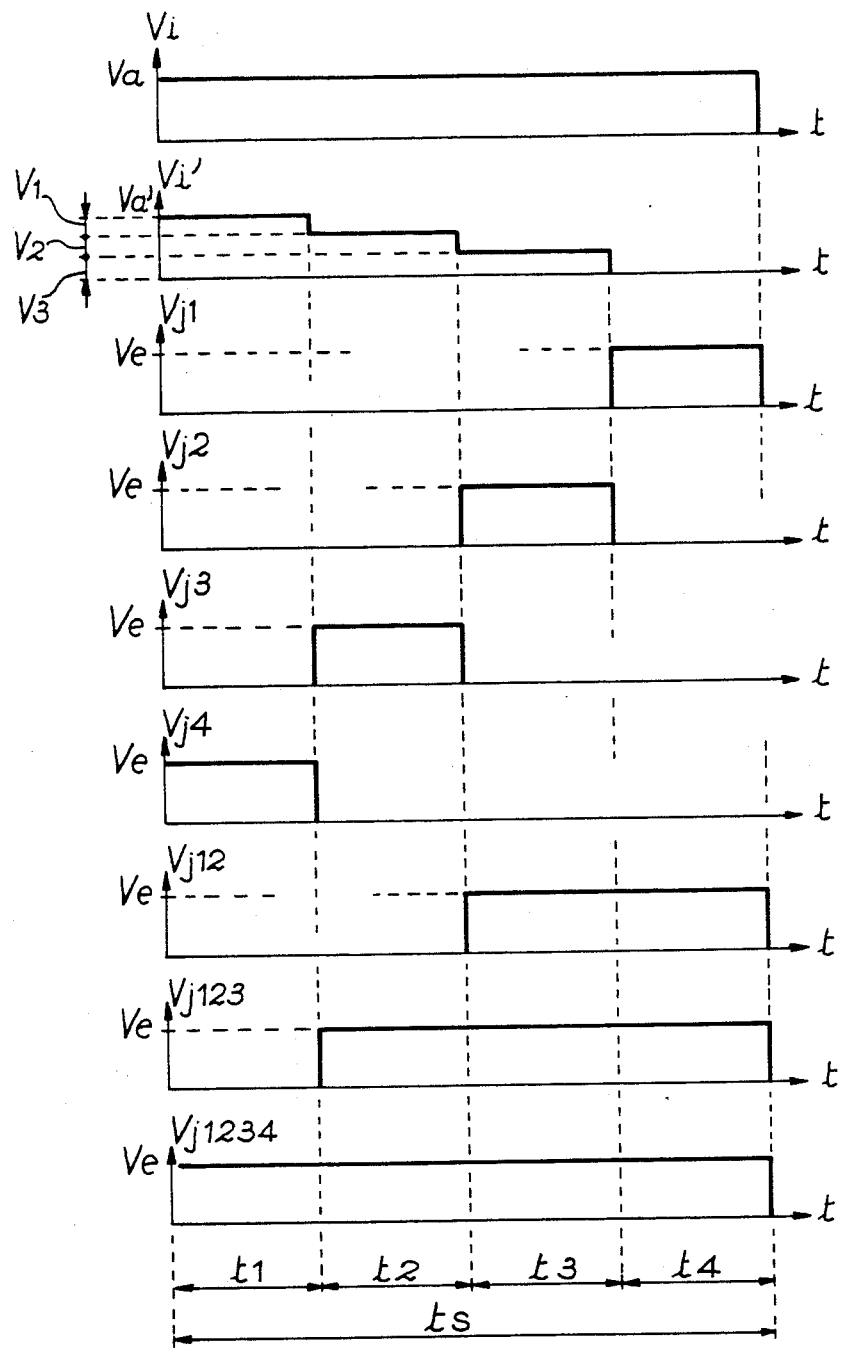
FIG. 4 is a timing diagram of another example of signals applied to the row conductors $L_i$ and $L_{i'}$ and to the column conductor $C_j$ for exciting the display material placed between the counterelectrode and one or more electrodes of the corresponding packet $P_{ii'j}$.

FIG. 4 gives a variant of the signals making it possible to control the optical property of the material at the image points corresponding to the electrode packets, no matter what the value of k. For reasons of clarity, k has been chosen equal to 4.

To row conductor $L_i$ is applied a signal $V_i$ and to row conductor $L_{i'}$ a signal $V_{i'}$. At time $t_1$, signals $V_i$ and $V_{i'}$ have the same value $V_a$. The gates of the transistors $I_1$, $I_2$, $I_3$ and $I_4$ associated with electrodes $E_1$, $E_2$, $E_3$ and $E_4$ are at potential $V_a$. Thus, transistors $I_1$, $I_2$, $I_3$ and $I_4$ are conductive.

At time $t_2$ signal $V_i$ is equal to $V_a$ and signal $V_{i'}$ is equal to $V_a - V_1$. The gates of transistors $I_1$, $I_2$, $I_3$, $I_4$ are respectively at potentials $V_a - V_1/5$, $V_a - 2V_1/5$, $V_a - 3V_1/5$, $V_a - 4V_1/5$. The value $V_1$ is chosen so as to verify the same condition as for FIG. 3. Thus, at time $t_2$ transistor $I_4$ is blocked and transistors $I_1$, $I_2$ and $I_3$ are conductive.

At time $t_3$, signal $V_i$ is equal to $V_a$ and signal $V_{i'}$ is equal to $V_a - (V_1 + V_2)$. The gates of transistors $I_1$, $I_2$, $I_3$ and $I_4$ are respectively at potentials $V_a - (V_1 + V_2)/5$, $V_a - 2(V_1 + V_2)/5$, $V_a - 3(V_1 + V_2)/5$, $V_a - 4(V_1 + V_2)/5$ with $V_2$ verifying the same condition as for FIG. 3. Thus, at time $t_3$, the transistors $I_3$ and $I_4$ are non-conductive and transistors $I_1$ and $I_2$ are conductive.

At time $t_4$, signal $V_i$ is equal to $V_a$ and signal $V_{i'}$ is equal to $V_a - (V_1 + V_2 + V_3)$. The gates of transistors $I_1$, $I_2$, $I_3$, $I_4$ are respectively at potentials $V_a - (V_1 + V_2 + V_3)/5$, $V_a - 2(V_1 + V_2 + V_3)/5$, $V_a - 3(V_1 + V_2 + V_3)/5$ and $V_a - 4(V_1 + V_2 + V_3)/5$ with $V_3$ verifying the same condition as for FIG. 3. Thus, at time $t_4$ transistors $I_2$, $I_3$ and $I_4$ are non-conductive and transistor $I_1$ is conductive.

Moreover, for controlling a displayed state at image point $A_{ii'j1}$, to the corresponding column conductor $C_j$ is supplied a zero signal $V_{j1}$ at times $t_1$, $t_2$, $t_3$ and equal to $V_e$ at time $t_4$. For controlling a displayed state at image point $A_{ii'j2}$, to the corresponding column conductor $C_j$ is supplied a zero signal $V_{j2}$ at time $t_1$, $t_2$ and $t_4$ and equal to $V_e$ at time $t_3$. For controlling a displayed state at image point $A_{ii'j3}$ to column conductor $C_j$ is supplied a zero signal $V_{j3}$ at times $t_1$, $t_3$, $t_4$ and equal to $V_e$ at time $t_2$. Finally, for controlling a displayed state at image point $A_{ii'j4}$, to the corresponding column conductor $C_j$ is supplied a zero signal $V_{j4}$ at times $t_2$, $t_3$ and $t_4$ and equal to $V_e$ at time $t_1$.

As a function of the image points of a packet of electrodes for which it is wished to control a displayed state, the signals $V_{j1}$, $V_{j2}$, $V_{j3}$ and $V_{j4}$ are combined for controlling said displayed state in two, three or even four image points.

Thus, signal $V_{j1,2}$ supplied to the column conductor $C_j$ corresponding to the sum of the signals $V_{j1}$, $V_{j2}$ makes it possible to control a displayed state at image points $A_{ii'j1}$ and $A_{ii'j2}$. Signal $V_{j1,2,3}$ supplied to column conductor $C_j$ corresponding to the sum of the signals $V_{j1}$, $J_{j2}$ and $V_{j3}$ makes it possible to control a displayed state at image points $A_{ii'j1}$, $A_{ii'j2}$, $A_{ii'j3}$. Signal $V_{j1,2,3,4}$ applied to the column conductor $C_j$ corresponding to the sum of $V_{j1}$, $V_{j2}$, $V_{j3}$ and $V_{j4}$ makes it possible to control a displayed state at image points $A_{ii'j1}$, $A_{ii'j2}$, $A_{ii'j3}$, $A_{ii'j4}$.

For controlling the display device according to the invention, thus e.g. to the row conductors $L_i$ and $L_{i'}$ are supplied exciting signals $V_i$ and $V_{i'}$, so that for each time fraction $t_l$ of the addressing time $T_s$ of the electrodes of an electrode packet the transistors $I_1 \ldots I_u$ associated with these electrodes are closed, u being an integer such that $u = k - (l - 1)$ and the other transistors associated with these electrodes are opened. The signals supplied to the column conductors are dependent on the desired display.

Figure 5:
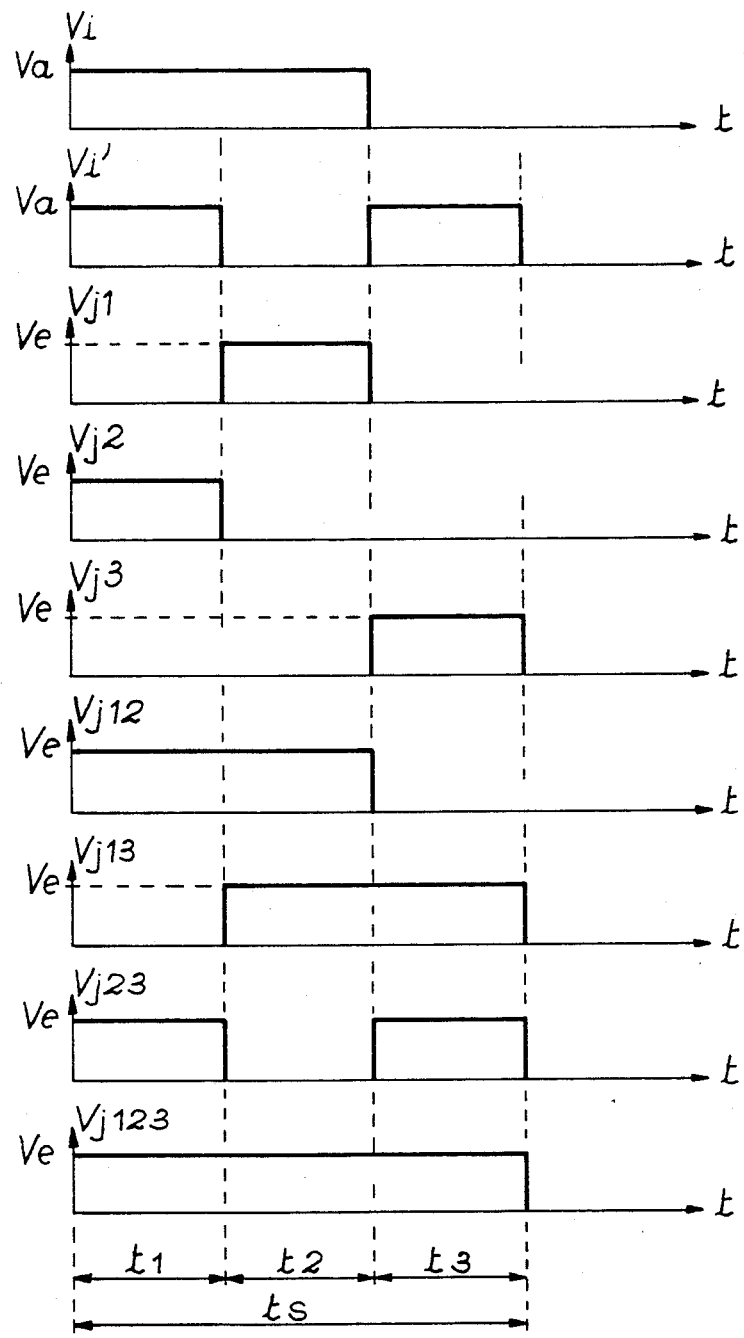
FIG. 5 is a timing diagram of another example of signals applied to the row conductors $L_i$ and $L_{i'}$ and to the column conductor $C_j$ in the particular case where k=3.

FIG. 5 gives an example of signals making it possible to control the display device in the particular case where each packet comprises three electrodes, such as in the case of a three-colour display.

Thus, for controlling the optical property of the material at image points $A_{ii'j1}$, $A_{ii'j2}$, $A_{ii'j3}$ corresponding to the packet $P_{ii'j}$ of electrodes $E_1$, $E_2$, $E_3$, to the row conductor $L_i$ is applied potential $V_i$ and to row conductor $L_{i'}$ potential $V_{i'}$. The addressing time $T_s$ of the packet $P_{ii'j}$ of electrodes is divided into three time fractions $t_1$, $t_2$ and $t_3$. At time $t_1$ signals $V_i$ and $V_{i'}$ have the same value $V_a$. The gates of transistors $I_1$, $I_2$, $I_3$ associated with electrodes $E_1$, $E_2$, $E_3$ of packet $P_{ii'j}$ are at potential $V_a$. Thus, transistors $I_1$, $I_2$, $I_3$ are conductive. At time $t_2$, signal $V_i$ is equal to $V_a$ and signal $V_{i'}$ is zero. The gates of transistors $I_1$, $I_2$, $I_3$ are respectively at potentials $V_a/2$, $V_a/3$, $V_a/4$ so that transistor $I_1$ is conductive and transistors $I_2$ and $I_3$ non-conductive. At time $t_3$, signal $V_i$ is zero and signal $V_{i'}$ is equal to $V_a$. The gates of transistors $I_1$, $I_2$, $I_3$ are respectively at potentials $V_a/4$, $V_a/3$, $V_a/2$, so that transistors $I_1$ and $I_2$ are non-conductive and transistor $I_3$ is conductive.

To control a displayed state at image point $A_{ii'j1}$, to the corresponding column conductor $C_j$ is supplied a zero signal $V_{j1}$ at times $t_1$ and $t_3$ and equal to $V_e$ at time $t_2$ during which only transistor $I_1$ is conductive. For controlling a displayed state at image point $A_{ii'j2}$, to column conductor $C_j$ is supplied a signal $V_{j2}$ equal to $V_e$ at time $t_1$ during which transistor $I_2$ is conductive and zero at the following times $t_2$ and $t_3$. For controlling a displayed state at image point $A_{ii'j3}$, to the corresponding column conductor $C_j$ is supplied a signal $V_{j3}$ zero at times $t_1$ and $t_2$ and equal to $V_e$ at time $t_3$ during which only transistor $I_3$ is conductive. For controlling a displayed state at image points $A_{ii'j1}$ and $A_{ii'j2}$, to the corresponding column conductor $C_j$ is supplied a signal $V_{j1,2}$ corresponding to the sum of the signals $V_{j1}$ and $V_{j2}$. For controlling a displayed state at image points $A_{ii'j1}$ and $A_{ii'j3}$ to the corresponding column conductor $C_j$ is supplied a signal $V_{j1,3}$ corresponding to the sum of the signals $V_{j1}$ and $V_{j3}$. For controlling a displayed state at images points $A_{ii'j2}$ and $A_{ii'j3}$, to the corresponding column conductor $C_j$ is supplied a signal $V_{j2,3}$ corresponding to the sum of the signals $V_{j2}$ and $V_{j3}$. Finally, for controlling a displayed state at image points $A_{ii'j1}$, $A_{ii'j2}$ and $A_{ii'j3}$ to the column conductor $C_j$ is supplied a signal $V_{j1,2,3}$ equal to the sum of the signals $V_{j1}$, $V_{j2}$ and $V_{j3}$.

It is obvious that for display devices having packets of three electrodes, the control proccesses described relative to FIGS. 3 and 4 are also applicable.

For displaying grey levels, the signals applied to the column conductors must assume variable voltage levels.

Figure 6:
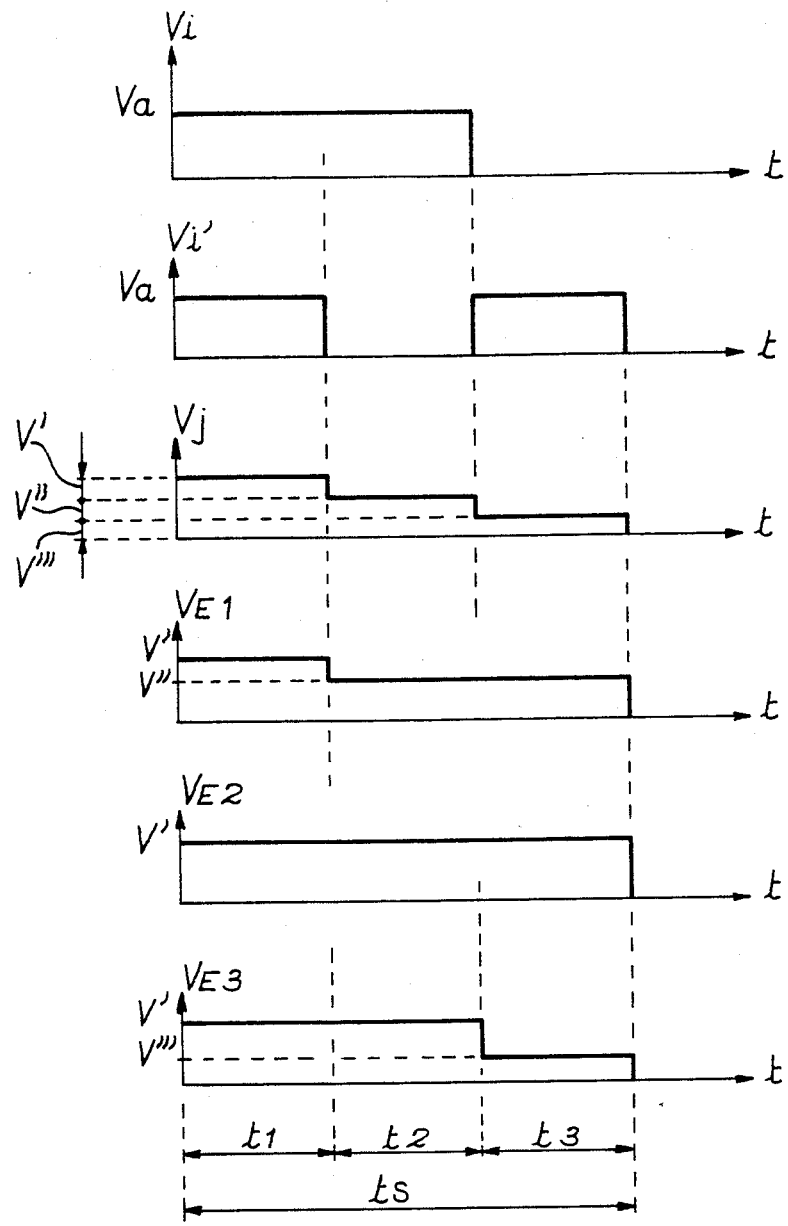
FIG. 6 is a timing diagram of an example of signals applied to the row conductors $L_i$ and $L_{i'}$ and to the column conductor $C_j$ in the case where k=3 making it possible to display different grey levels.

In the case of a packet of three electrodes, FIG. 6 shows in exemplified manner the signal applied to the column conductor $C_j$ making it possible to display grey levels at the corresponding image points.

Signals $V_i$ and $V_{i'}$ applied to the row conductor $L_i$ and $L_{i'}$ are e.g. identical to those described relative to FIG. 5. However, the signal $V_j$ applied to the column conductor $C_j$ assumes different values V', V'', V''', all three of said values being equal to or higher than the threshold potential $V_S$ and such that V' V'' V'''.

Thus, at time $t_1$ during which transistors $I_1$, $I_2$ and $I_3$ are conductive, the signal applied to the column conductor $C_j$ is equal to V' and the potentials $V_{E1}$, $V_{E2}$ and $V_{E3}$ respectively of electrodes $E_1$, $E_2$ and $E_3$ are equal to V'.

At time $t_2$ during which the transistor $I_1$ is conductive, transistors $I_2$ and $I_3$ are blocked, the signal $V_j$ applied to the column conductor $C_j$ assuming the value V'''. Furthermore, the potentials $V_{E1}$, $V_{E2}$, $V_{E3}$ of electrodes $E_1$, $E_2$, $E_3$ are respectively equal to V''', V' and V'.

At time $t_3$ during which transistors $I_1$ and $I_2$ are blocked and transistor $I_3$ conductive, signal $V_j$ supplied to the column conductor $C_j$ assumes the valve V'''', the potentials $V_{E1}$, $V_{E2}$ and $V_{E3}$ respectively of electrodes $E_1$, $E_2$, $E_3$ are consequently equal to V''', V' and V'''.

The potentials retained by electrodes $E_1$, $E_2$ and $E_3$ during the remainder of the period correspond to potentials V''', V' and V''', except for the load leaks. These different potential values consequently make it possible to display different grey levels at each image point associated with a group of electrodes of the display device.

FIGS. 3 to 6 illustrate examples of control processes, whereof the signals applied to the row conductors vary from the value $V_a$ to a zero value and the signals applied to the column conductors vary from $V_e$ or V' to a zero value, but obviously the signals applied to the row conductors varying from value $V_a$ to a non-zero value below $V_t$ make it possible to select in the same way the conductive or non-conductive state of the transistors and the signals applied to the column conductors varying from $V_e$ or V' to a non-zero value below $V_S$ are also possible.

Moreover, the examples of the control process described hereinbefore are not limitative and numerous variants are possible thereto without passing beyond the scope of the invention.

Thus, for example, with the control processes described relative to FIGS. 3 and 4 by applying exciting signals to the column conductors assuming different values, as described relative to FIG. 6, it is also possible to display different grey levels.

Moreover, FIGS. 3 and 4 show signals $V_i$ and $V_{i'}$, applied to the row conductors $L_i$ and $L_{i'}$, whereof one has a fixed value and another a variable value during time $T_s$, but obviously it is possible to apply to said row conductors signals $V_i$ and $V_{i'}$ respectively assuming different values during time $T_s$ so as to select for each time fraction $t_l$ of time $T_s$, the closure of at least one of the switches associated with an electrode packet.

The above description relates to a display device having a matrix of electrodes and a counterelectrode, but it is obvious that the invention also applies to other display devices, such as that described in FR-A-No. 2 553 218.

Thus, for example, a display device according to the invention of the type described in FR-A-No. 2 553 218 has a display material inserted between two walls. On one of the walls are arranged m column conductors, each connected to a column electrode and on the other wall n row conductors, $p=(n-1).m$ resistive conductors and p.k electrodes, each resistive conductor $R_{ii'j}$ being connected between two row conductors $L_i$ and $L_{i'}$ with $i \neq i'$, $1 \leq i < n$, $1 < i \leq n$, and $1 \leq j \leq m$. The p.k electrodes are grouped into p packets of k electrodes each, all the electrodes of a packet facing the same column electrode. Moreover, the electrodes $E_1 \ldots E_k$ of a packet $P_{ii'j}$ are respectively connected by transistors $I_1 \ldots I_k$ to the resistive conductor $R_{ii'j}$, itself being connected between the row conductors $L_i$ and $L_{i'}$, said transistors also being connected to a reference potential.

We claim:

1. A matrix device having a liquid crystal material with an optical property inserted between a first and a second insulating wall, said device comprising a matrix of p packets of k elements each, each of said elements being constituted by a switch and an image point defined by a capacitor formed of two opposed electrodes on said first and second insulating walls, n row conductors, m column conductors, p resistive conductors, each resistive conductor Rii'j being connected between two row conductors Li, L$_{i'}$, with p, k, n, m, i, i' and j being integers such that $1 \leq i < n$, $1 < i' \leq n$ and $i' = i+1$, $1 \leq j \leq m$ and $p = m \cdot (n-1)$, and said elements of each of said packets being connected to a column conductor and to a resistive conductor, and means for conducting signals appropriate for the excitation of said display material to said row conductors and to said column conductors.

2. Matrix display according to claim 1, characterized in that on the inner face of the first wall there are n row conductors, m column conductors, p resistive conductors and electrodes grouped into p packets of k electrodes each, with p, k, m and n being integers and $p = m(n-1)$, the electrodes $E_1 \ldots E_k$ of a packet $P_{ii'j}$ being respectively connected by switches $I_1 \ldots I_k$ to a column conductor $C_j$ and to a resistive conductor $R_{ii'j}$, itself connected between two row conductors $L_i$ and $L_{i'}$, with i, i' and j such that $1 \leq i < n$, $1 < i' \leq n$, $i' = i+1$ and $1 \leq j \leq m$ and on the inner face of the second wall is disposed a counterelectrode formed from a continuous layer of a conductive material raised to a reference potential.

3. Display device according to claim 2, characterized in that the switches are field effect transistors, each transistor $I_l$ associated with an electrode $E_l$ of a packet $P_{ii'j}$ being connected by its gate to the corresponding resistive conductor $R_{ii'j}$, by a second terminal to the corresponding column conductor $C_j$ and by a third terminal to the electrode $E_l$, with L being integer such that $1 \leq l \leq k$.

4. Display device according to claim 1, characterized in that the resistive conductors comprise resistors connected one to the other in series.

5. Display device according to claim 1, characterized in that the resistive value of each resistive conductor of the device is identical.

6. Display device according to claim 1, characterized in that the resistive value of a resistive conductor $R_{ii'j}$ that is connected by k switches $I_1 \ldots I_k$ to the image points $A_{ii'j1} \ldots A_{ii'jk}$ of a packet of elements, between the row conductor $L_i$ and switch $I_1$, between the row conductor $L_{i'}$ and switch $I_k$ and between the different switches $I_1$ and $I_2$, $I_2$ and $I_3 \ldots I_{i-1}$ and $I_k$ to which it is connected, is identical with i, i', j and k being integers such that $i \neq i'$, $1 \leq i < n$, $1 < i \leq n$ and $1 \leq j \leq m$.

7. A process for the control of a liquid crystal display device characterized in that for controlling the optical property of the display material at image points $A_{ii'j1} \ldots A_{ii'jk}$ corresponding to a packet of elements, with i, i', j and k being integers such that $1 \leq i < n$, $1 < i' \leq n$, $i' = i+1$ and $1 \leq j \leq m$, during a time $T_s = T/(n-1)$ divided into k time fractions $t_l$ are applied to the row conductors $L_i$ and $L_{i'}$, respectively exciting signals $V_i$ and $V_{i'}$, so that for each time fraction $t_l$ at least one of the switches $I_1 \ldots I_k$ associated with said points is closed, so that each of said switches is closed over at least one time fraction $t_l$, with l being an integer such that $1 \leq l \leq k$, said switches being connected to the resistive conductor $R_{ii'j}$ and to the other row conductors, exciting signals bringing about the opening of the switches associated with said other row conductors, T being the addressing period of an image point, and in that, at each time $T_s$, a signal corresponding to an information to display on the image points is applied on the column conductors.

8. Control process according to claim 7, characterized in that to the row conductors $L_i$ and $L_{i'}$ are respectively applied exciting signals $V_i$ and $V_{i'}$, so that at each time fraction $t_l$ of the addressing time $T_s$ of image points $A_{ii'j1} \ldots A_{ii'jk}$, with l being an integer such that $1 \leq l \leq k$, one of the switches associated with said image points and closed during time $t_{l-1}$ is opened, the other switches remaining in their state, all the switches associated with said image points being closed at time $t_1$.

9. Control process according to claim 7, characterized in that to the row conductors $L_i$ and $L_{i'}$, are respectively applied exciting signals $V_i$ and $V_{i'}$, so that at each time fraction $t_l$ of the addressing time $T_s$ of the image points $A_{ii'j1} \ldots A_{ii'jk}$, the switches $I_1 \ldots I_u$ associated with said image points are closed, with u being an integer such that $u = k - (l-1)$ and the other switches associated with said image points are opened.

10. Control process according to claim 7, characterized in that to the row conductors $L_i$ and $L_{i'}$ are respectively applied exciting signals $V_i$ and $V_{i'}$, so that at each time fraction $t_l$ of the addressing time $T_s$ of the image points $A_{ii'j1} \ldots A_{ii'jk}$ the switches $I_l \ldots I_k$ associated with said image points are closed and the other switches associated with said image points are opened.

11. Control process according to claim 7, characterized in that k is equal to three, so that to the row conductors $L_i$ and $L_{i'}$ are respectively applied exciting signals $V_i$ and $V_{i'}$, so that at time $t_1$ switches $I_1$, $I_2$ and $I_3$ are closed, at time $t_2$ switch $I_1$ is closed and switches $I_2$, $I_3$ are opened and at time $t_3$ switch $I_3$ is closed and switches $I_1$ and $I_2$ are opened, times $t_1$, $t_2$, $t_3$ being three time fractions of the addressing time $T_s$ of the image points $A_{ii'j1}$, $A_{ii'j2}$, $A_{ii'j3}$.

* * * * *